(12) United States Patent
Verma et al.

(10) Patent No.: US 10,323,336 B2
(45) Date of Patent: Jun. 18, 2019

(54) SYSTEM, METHOD AND DEVICE FOR QUENCHING SYNTHETIC MULTIFILAMENT FIBERS

(71) Applicant: RELIANCE INDUSTRIES LIMITED, Mumbai Maharashtra (IN)

(72) Inventors: Rohit Verma, Madhya Pradesh (IN); Achal Saran Khare, Uttar Pradesh (IN); Sumanta Chatterjee, West Bengal (IN); Uday Shankar Agarwal, Maharashtra (IN)

(73) Assignee: RELIANCE INDUSTRIES LIMITED, Mumbai (IN)

(*) Notice: Subject to any disclaimer, the term of this patent is extended or adjusted under 35 U.S.C. 154(b) by 323 days.

(21) Appl. No.: 15/021,754

(22) PCT Filed: Sep. 4, 2014

(86) PCT No.: PCT/IN2014/000579
§ 371 (c)(1),
(2) Date: Mar. 14, 2016

(87) PCT Pub. No.: WO2015/044953
PCT Pub. Date: Apr. 2, 2015

(65) Prior Publication Data
US 2016/0222547 A1 Aug. 4, 2016

(30) Foreign Application Priority Data
Sep. 26, 2013 (IN) .......................... 3075/MUM/2013

(51) Int. Cl.
*D01D 5/088* (2006.01)
*B29C 47/00* (2006.01)
(Continued)

(52) U.S. Cl.
CPC .......... *D01D 5/088* (2013.01); *B29C 47/0014* (2013.01); *B29C 47/8815* (2013.01); *B29C 47/8885* (2013.01); *B29L 2031/731* (2013.01)

(58) Field of Classification Search
CPC ............ B29C 47/0071; B29C 47/0088; B29C 47/8815; B29C 47/8835; D01D 5/088; D01D 5/092
(Continued)

(56) References Cited

U.S. PATENT DOCUMENTS

| | | | | |
|---|---|---|---|---|
| 3,487,144 A | * | 12/1969 | Sarian | .................... D01D 5/088 264/211.14 |
| 6,375,882 B1 | | 4/2002 | Marlow et al. | |
| 2006/0226573 A1 | * | 10/2006 | Stundl | .................... D01D 5/088 264/211.14 |

FOREIGN PATENT DOCUMENTS

DE    10 2009 042 229 A1    4/2011

OTHER PUBLICATIONS

DE 10 2009 042 229 A1 English Abstract.

* cited by examiner

*Primary Examiner* — Monica A Huson
*Assistant Examiner* — Kelsey C Grace
(74) *Attorney, Agent, or Firm* — Ladas & Parry LLP (57) ABSTRACT

Described herein is a quenching system comprising a spinneret to spin molten polymer, a quench stack disposed operatively below the spinneret and the flow communication with the spinneret, a first means to provide a first stream of ambient air to provide partially-quenched solidified fibers of the molten polymer spun through the spinneret, at a solidification temperature and a second means to provide a second stream of conditioned air at a below-ambient temperature for further quenching the partially quenched solidified fibers, wherein the second stream of the conditioned air is provided
(Continued)

through an adapter placed operatively below a region where the molten polymer solidifies partially.

19 Claims, 5 Drawing Sheets

(51) Int. Cl.
*B29C 47/88* (2006.01)
*B29L 31/00* (2006.01)

(58) Field of Classification Search
USPC .................................. 264/211.14, 211.15, 237
See application file for complete search history.

SYSTEM, METHOD AND DEVICE FOR QUENCHING SYNTHETIC MULTIFILAMENT FIBERS

TECHNICAL FIELD

The present invention relates to quenching of multifilament fibers extruded through melt spinning.

BACKGROUND

In conventional melt spinning processes, in particular those used for polyesters, the filaments are extruded/drawn at high temperatures, close to 300° C. These filaments or fibers are cooled down to their glass transition temperature ($T_G$) under stretched conditions using cold or conditioned air to get the desired rheological properties.

Generally, the extruded filaments are quenched by blowing conditioned air from a screen in a direction perpendicular to a path of the drawn filaments. The cold or conditioned air temperature is typically kept between 18° C. to 25° C. and is blown at a speed of about 0.5 to 1 m/s by means known in the art, for example, a blower. The temperature and speed of the conditioned air is adjusted within the range depending upon the denier to be spun. The process is commonly known as cross flow quench system.

The cross-flow quench system is the most widely used quenching system. However, in a typical cross-flow quench system the filaments reach the desired temperature at which they can safely be spun by the time they reach half of the screen length; thereafter, the cold air gets wasted.

There have been systems known in art that have tried to save on the chilling cost of air for quenching purposes. For example, in some cross-flow quench systems, ambient air is used to cool off the filaments to certain length before the same can be further cooled down to the desired temperature by using less amount of conditioned air. However, the refrigeration or conditioning cost associated with quenching systems is still substantial and needs further correction in the state-of-the-art.

Even in systems that use a combination of ambient air and cold air in step-wise quenching, there is no precise estimation of a location from where the conditioned air should be blown across the filaments in order to have a consistent lot of spun fiber with, the desired properties and with minimum requirement of conditioned air. Thus, with the existing quenching systems, the quality and/or rheological properties of the end product is hard to maintain.

OBJECTS

Some of the objects of the system of the present disclosure, which at least one embodiment discussed herein satisfies, are as follows:

It is an object of the present disclosure to ameliorate one or more problems of the state-of-the-art or at least provide a useful alternative.

It is an object of the present disclosure to provide a system and/or a device for quenching filaments extruded from melt spinning at a reduced cost.

Another object of the present disclosure is to provide a method of quenching multi-filament fibers extruded from melt spinning that substantially reduces the use of cold or conditioned air.

SUMMARY

Described herein is a quenching system comprising a spinneret to spin molten polymer, a quench stack disposed operatively below the spinneret and in flow communication with the spinneret, first means to provide a first stream of ambient air to provide partially-quenched solidified fibers of the molten polymer spun through the spinneret, at a solidification temperature and second means to provide a second stream of conditioned air at a below-ambient temperature for further quenching the partially quenched solidified fibers, wherein the second stream of the conditioned air is provided through an adapter placed operatively below a region where the molten polymer solidifies partially.

The system includes a spin finish applicator located operatively below the adapter. The spin finish applicator is disposed on an operating front of a cross-flow quench screen. The spin finish applicator is further adapted to be adjusted along the height of the quench stack.

The spin finish applicator can be adapted to be adjusted along the height of the quench stack in the range of 0.5 meters to 1.2 meters.

The system includes a yarn guide located operatively below the adapter. The yarn guide is disposed operatively below the spin finish applicator. The yarn guide is adapted to be adjusted along the height of the quench stack.

The yarn guide can be adapted to be adjusted along the height of the quench stack in the range of 0.5 meters to 1.2 meters.

The adapter comprises one or more cylindrical units for allowing the fibers to pass through the adapter.

Each of the one or more cylindrical units can have a perforated contour.

The cylindrical units are attached to an inner base surface of a bottom box of the adapter via a threaded disc.

The cylindrical units are attached to a top side edge surface of a bottom box of the adapter via a threaded disc.

The quenching system comprises at least one filament guide for each of the cylindrical units, wherein each of the filament guides comprises at least a set of two plates shaped as two diametrically opposite apostrophes with their curved surfaces facing each other.

The two plates are attached to a top cover of the adapter such that a gap remains between the two plates.

The gap between the two plates can be from about 5 mm at a widest portion and 2 mm at a narrowest portion.

The adapter comprises lateral perforated plates disposed inside the adapter along a length of the adapter.

The second stream is provided via an air duct in flow communication with the cylindrical units of the adapter via at least one platform passage.

The second stream enters the adapter radially via the cylindrical units.

The first stream of quench air can be at a temperature of about 25° C. and above.

The second stream of conditioned air can be at a temperature below 25° C.

The first means is configured to blow the first stream of ambient air across the quench stack.

Each of the first means and the second means can comprise a blower.

The solidification temperature is glass transition temperature ($T_G$).

In accordance with another aspect of the present disclosure, a method for quenching comprises spinning molten polymer through a spinneret into a quench stack disposed operatively below the spinneret, subjecting the molten polymer to a first stream of ambient air to provide partially quenched solidified fibers at a solidification temperature, and further quenching the partially quenched solidified fibers below the solidification temperature with a second stream of conditioned air at a below-ambient temperature to provide quenched fibers, wherein the second stream of conditioned air is provided separate of the first stream of ambient air through an adapter operatively below a region where the molten polymer solidifies partially.

The adapter is placed operatively above at least one of a spin finish applicator and a yarn guide.

The first stream of ambient air can be at an ambient temperature of 25° C. and above.

The first stream of ambient air can be provided substantially perpendicular to a length of the quench stack.

The first stream of conditioned air can be provided by a blower.

The second stream of conditioned air can be at a temperature below 25° C.

The second stream of conditioned air can be provided by a blower.

The second stream of conditioned air is force circulated inside the adapter.

The solidification temperature is the glass transition temperature ($T_G$).

The second stream of conditioned air can enter the adapter radially.

BRIEF DESCRIPTION OF DRAWINGS

The system, method and device for quenching synthetic multi-filament fiber of the present disclosure will now be explained in relation to the accompanying non-limiting drawings, in which.

DETAILED DESCRIPTION

The disclosure will now be described with reference to the accompanying drawings, which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description hereinafter, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The present invention relates to a process of quenching filaments extruded through spinnerets in a quench stack placed operatively below the spinnerets using a stream of ambient air to provide partially quenched or solidified fibers at a solidification temperature, followed by further quenching using another stream of conditioned air inside an adapter, just above a spin finish applicator or yarn guide and below a region where the molten polymer gets solidified partially. The stream of conditioned air through the adapter helps cool down the partially solidified fibers to a desired temperature before the spin finish application or take-up.

The position of the adapter is chosen such that the filaments entering the adapter are already at a temperature below the glass transition temperature $T_G$ before they come into contact with the conditioned air inside the adapter. Typically, the adapter is positioned close to the point of convergence of filaments such as the spin finish applicator, thereby reducing the diameter of circular entries in the adapter and hence the net air consumption. The conditioned air can be provided, for example, by using a blower. With this, the conditioned air is forcefully circulated inside the adapter, thereby providing more efficient quenching of the fibers. Furthermore cooling inside the adapter does not influence the melt stretching/drawing phenomenon, but only cools the filament to a temperature where fast moving filaments do not interact adversely, such as in a stick-slip manner, during the finish application. By using the process and system of the present disclosure, the requirement of chilled air is reduced by 70%, resulting in substantial savings in the chilling cost.

A quench system for melt spinning, in accordance with the present disclosure, will be explained with references to FIGS. 1 to 4. The components of the assembly are referenced generally by numerals as indicated in the accompanying drawings.

Figure 1:
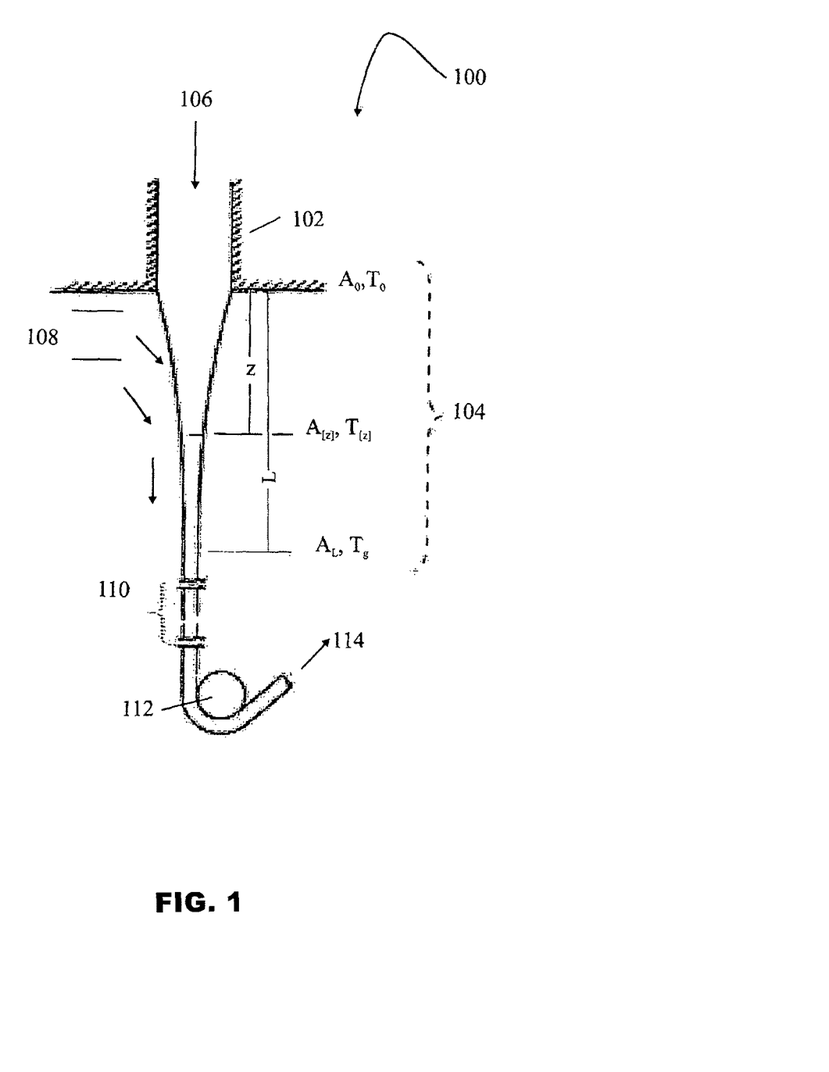
FIG. 1 illustrates a line diagram representing a quenching system for melt spinning, in accordance with an embodiment of the present disclosure.

Referring to FIG. 1 of the drawings, a quenching system 100 illustrates the distal end of a spinneret 102 in flow communication with a quench stack 104 disposed below the spinneret 102 in an operating position. A hole or capillary in the distal end of the spinneret 102 is communicatively attached to the quench stack 104. The quench stack 104 is broader towards the end where it is attached to the spinneret 102 and is narrower at the other end. The spinneret 102 is disposed in a vertical position to allow gravitational force to act on the fibers extruded following melt spinning. A polymeric material in molten state passes through the spinneret 102 and moves into the quench stack 104 below the spinneret 102 along the direction shown by arrow 106.

The area of a filament at extrusion from the capillary of the spinneret and its temperature is represented by $A_0$ and $T_0$ respectively. A cross-flow of ambient air represented by arrow 108 is blown across the length of the quench stack 104, for example, via a screen (not shown). In an embodiment, the temperature of the ambient air is 25° C. or above.

When the molten polymer reaches a distance 'Z' of the quench stack 104, its temperature drops to $T_Z$ due to the application of ambient air. At this point, the area of the filament is represented by $A_Z$. Subsequently, the molten polymer reaches a length 'L' from spinneret 102, just above a finish application stage of the melt spinning process. Till this length, the molten polymer is in contact with the cross flowing ambient air. The temperature of the filament at this distance 'L' is represented by $T_G$, which denotes glass transition temperature, and the area of the filament by $A_L$. The point 'L' is the transition point where the molten polymer transitions to a glass state. In an embodiment, the transition or freeze point 'L' is at a distance typically of about 300 mm from the spinneret 102. However, it will be appreciated by persons skilled in the art that the position of the freeze point 'L' may vary according to filament denier. In an embodiment, the cross-flow of ambient air cools down the molten polymer from a temperature of about 250° C. to 100° C.

The cross-flow of ambient air provides partially quenched and/or solidified fibers. These partially quenched fibers are further quenched or cooled inside an adapter 110, which is installed just before the finish application and below the region where the molten, polymer transitions to the glass state. In an embodiment, the adapter 110 is located at a distance of typically about 600 mm to 1000 mm from the spinneret 102. However, again as will be easily appreciated, this distance may also vary based on the filament denier.

Figure 2:
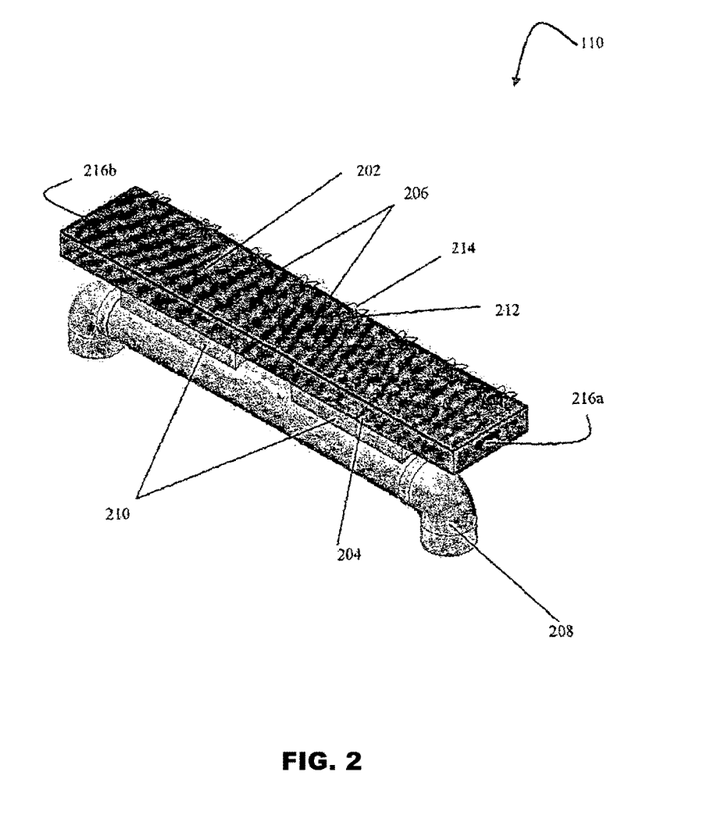
FIG. 2 illustrates an adapter of the quenching system, in accordance with an embodiment of the present disclosure.
Figure 5:
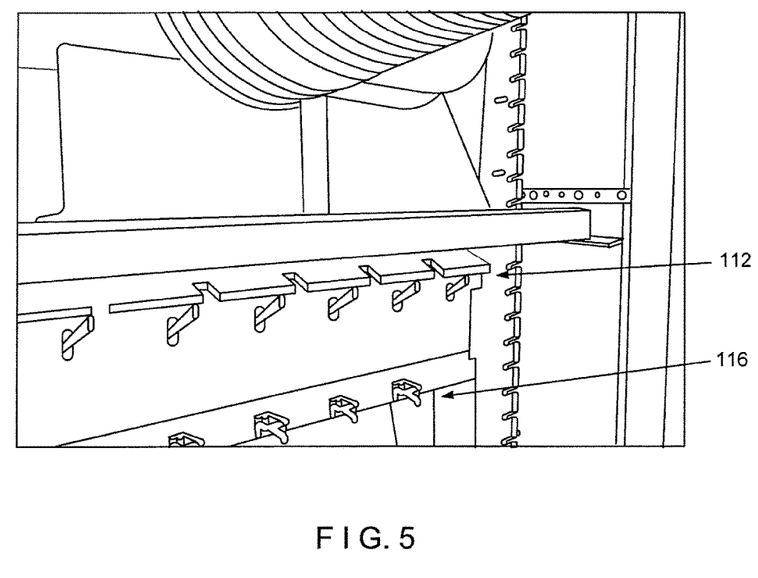
FIG. 5 illustrates a perspective view of spin finish applicator and a yarn guide of a quenching system of FIG. 1.

The partially-quenched fibers enter into the adapter 110 and cool down to the desired temperature by the conditioned air provided, for example, by using a blower. Thereafter, the fibers are finally obtained at the spin finish applicator 112 and are wound, for example, on a mandrel in the direction of direction arrow 114. In an embodiment, the air pressure inside the adapter 110 can be controlled using an external pressure regulator (not shown), if required, depending upon the denier being spun. The spin finish applicator 112 applies finish at an even rate to moving fibers so that the fibers are evenly coated with the finish. In one embodiment, the spin finish applicator 112 is, located operatively below the adapter 110 and is disposed on an operating front of a cross-flow quench screen, wherein the cross-flow quench screen enables cooling gases, such as air, to blow at increased speed to cool the filaments. The spin finish applicator 112 is further adapted to be adjusted along the height of the quench stack. Typically, the spin finish applicator 112 is adapted to be adjusted along the height of the quench stack in the range of 0.5 meters to 1.2 meters. The quenching system 100 further includes a yarn guide 116 (illustrated in FIG. 5). The yarn guide 116 is used for receiving and guiding the yarn and transferring the yarn to a wind-up mechanism. The yarn guide is located operatively below the adapter 110 and is disposed operatively below of the spin finish applicator 112. The yarn guide 116 is adapted to be adjusted along the height of the quench stack. Typically, the yarn guide is adapted to be adjusted along the height of said quench stack in the range of 0.5 meters to 1.2 meters. FIG. 2 shows a perspective view of the adapter 110 of the quenching system 100 of FIG. 1, in accordance with an embodiment. The adapter 110 is located just above the spin finish applicator 112 and is configured to cool down the filaments entering the adapter 110 from the quench stack 104 to a desired temperature using the conditioned air. In an embodiment, the temperature of the conditioned air entering the adapter 110 is about 16-25° C.

As shown, the adapter 110 has a top cover 202 fitted above a bottom box 204 via holes 206. Through each of these holes 206, a bolt could be fastened on top side edges of the bottom box 204. An air duct 208 is provided below a base of the bottom box 204 for providing the cold or conditioned air inside the adapter 110 via passages 210. The partially-quenched fibers are guided into circular zones 212 with the help of filament guides 214. Through these circular zones 212, the cold air comes in contact with the fibers radially. In an embodiment, the circular zones 212 have a diameter of about 25 mm.

The adapter, in an embodiment, is provided with sliders (not shown) attached to side surfaces 216a and 216b. With the help of these sliders, the adapter 110 can be pulled or pushed laterally above the passages 210 during 'string up'. String up, as used in the industry, means threading of filaments from a spinneret floor to a winder. In an embodiment, a length which the partially-quenched fibers can travel inside the adapter 110 is about 50 mm. The length of the adapter 110 depends on the denier of the fiber. For a fiber of a particular denier entering the adapter 110, a separate circular zone will be required. In an embodiment, the distance of circular zones is the same as that of a pitch of spinnerets in spinning position. Further, the width of the box may be about 200 mm.

Figure 3:
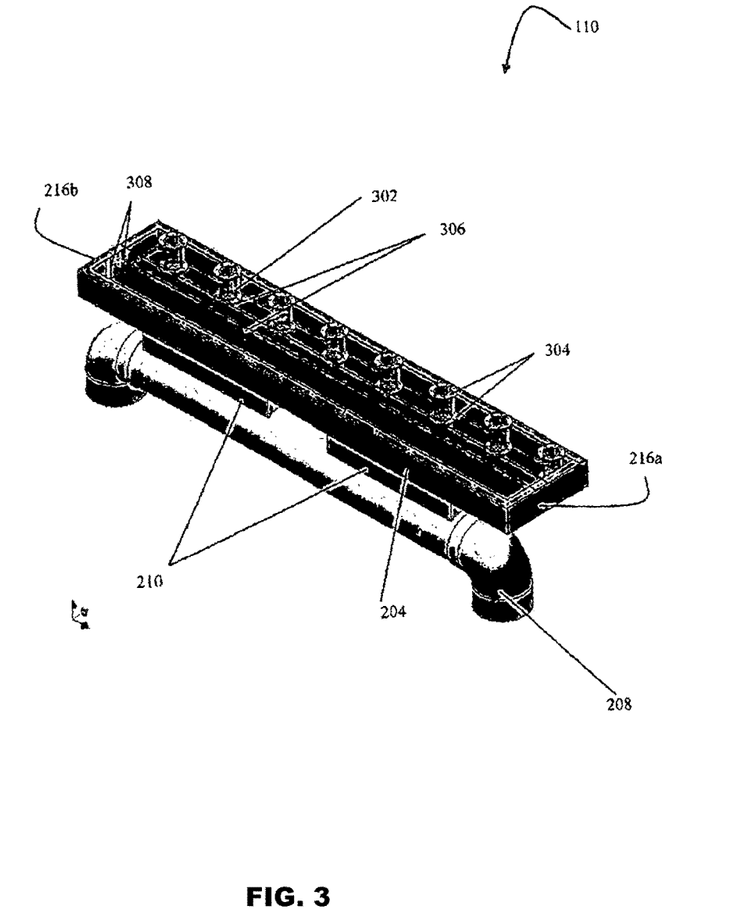
FIG. 3 illustrates perforated cylinders and perforated plates of the adapter of FIG. 2.

FIG. 3 illustrates a perspective view of the adapter 110 with the top cover 202 removed. The adapter 110 includes one or more cylinder units 302 for each bundle of filaments entering the adapter 110. In an embodiment, the cylindrical units 302 have a C-shaped cross-section to facilitate string up of the filaments. The cylinder units 302 are welded or bolted to an inner base surface and side edges of the bottom box 204 through threaded C-shaped discs 304 and are in flow connection with the air duct 208 through one or more platform-shaped passages 210.

In an embodiment, the cylinder units 302 have a perforated contour. Further, the adapter 110 has lateral plates 306 placed along a length of the adapter 110, also having perforations for the passage of air. In an embodiment, two lateral plates 306 are placed inside the adapter 110. The lateral plates 306 are intended for uniform air distribution. The lateral plates 306 are fitted in slots 308 provided at side surfaces 216a and 216b of the bottom box 204. With such an arrangement, the partially quenched filaments passing through the cylinder units 302 come in contact with a uniform distribution of the conditioned air force-circulated through the perforations of the cylinder units 302 and the lateral plates 306.

Figure 4:
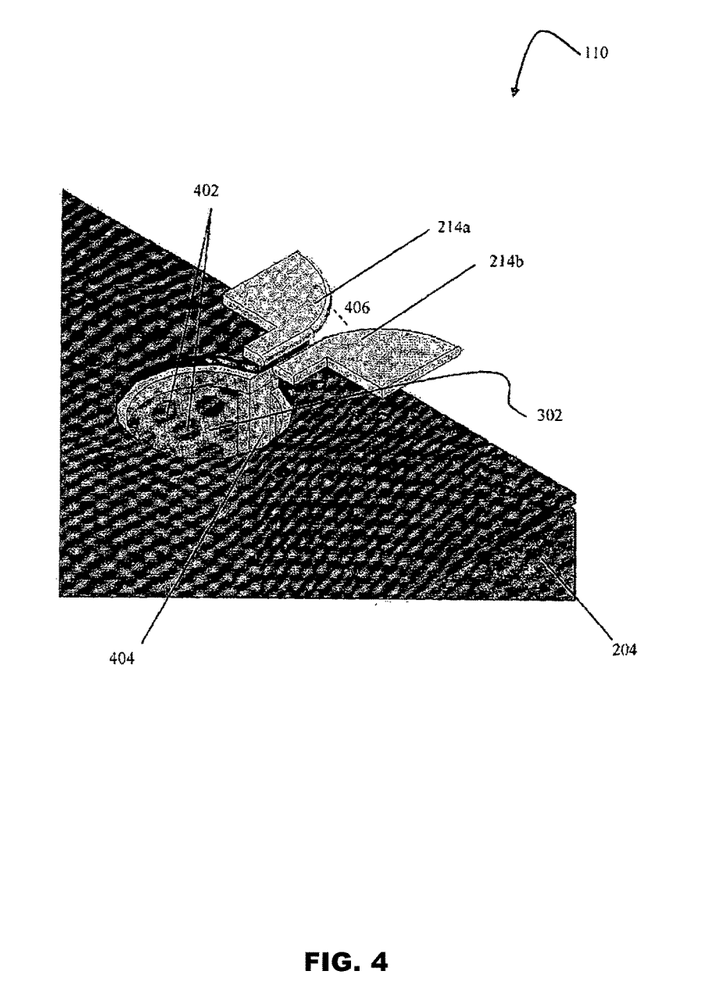
FIG. 4 illustrates an expanded view of a filament guide attached to the adapter of FIG. 2.

FIG. 4 illustrates an expanded view of a filament guide 214 attached to the adapter 110 of FIG. 2. As shown, the filament guide 214 is attached to the top surface of the top cover 202, preferably through welding or by bolting. The filament guide 214 is shaped so that the filaments can be made to pass through the C-shaped cylindrical units 302 during the string up of filaments. In an embodiment, the filaments guide 214 is a set of two plates 214a and 214b shaped as two diametrically opposite apostrophes with their curved surfaces facing each other. The two plates 214a and 214b are placed on the top cover 202 such that a gap 406 exists between the two plates 214a and 214b for the entry of filaments during string up. In an embodiment, the gap 406 between the plates 214a and 214b is from about 5 mm at the widest portion to about 2 mm at the narrowest portion. With such a shape, the partially quenched fibers entering the circular zones 212 of the cylindrical units 302 do not touch any rough part.

During string up, the adapter 110 is pulled away from the position where it is in flow connection with the air duct 208 and is placed below the line of flow of the filaments from the quench stack 104. In this position, the flow of cold air from the air duct 208 into the adapter 110 may be blocked. The filaments are then placed inside the circular zones 212 through the filament guide 214 and a slit 404 of the C-shaped cylindrical unit 302. After string up, the adapter 110 can be slide back to its initial position where it again gets in flow communication with the air duct 208. A flow of conditioned air of about 16 to 25° C. coming from the air duct passes radially from each of the cylindrical units 302 through the platform passages 210 provided substantially along the length of the adapter 110. With such an arrangement, the distribution of the conditioned or cold air in all of the cylindrical units remains uniform all across the adapter 110. Further, the perforations 402 in the cylindrical units provide for forced circulation of air inside the adapter 110. The uniform distribution of cold air is further supported by the perforated lateral plates 306.

Technical Advancements and Economic Significance

The quenching system, method and device, in accordance with the present disclosure described herein above has several technical advantages including but not limited to the realization of:

- The system uses the ambient air more efficiently, thereby significantly reducing the refrigeration cost involved in providing cold air for quenching purposes.
- The system allows cooling down of the partially quenched fibers using force-circulated cold air, thereby allowing efficient cooling of the fibers with less amount of cold air.
- Further the system allows uniform distribution of cold air over the whole of the space inside the adapter.
- Further the system facilitates separation of the cooling zones, thereby avoiding any deflection that may occur from cooling inside the quench stack.
- In addition, the system reduces chances of repetitive cooling of the same portion of the filaments.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The invention claimed is:

1. A quenching system comprising:
a spinneret to spin molten polymer;
a quench stack disposed operatively below said spinneret and in flow communication with said spinneret;
first means to provide a first stream of ambient air to provide partially-quenched solidified fibers of said molten polymer spun through said spinneret, at a solidification temperature; and
second means to provide a second stream of conditioned air at a below-ambient temperature for further quenching said partially quenched solidified fibers;
wherein said second stream of said conditioned air is provided through an adapter placed operatively below a region where said molten polymer solidifies partially, wherein said adapter comprises
a top cover fitted above a bottom box;
one or more cylindrical units for allowing said partially quenched fibres to pass through said adapter;
wherein said cylindrical units are attached to:
an inner base surface of said bottom box of these said adapter via a threaded disc; and
a top side edge surface of said bottom box of said adapter via a threaded disc;
wherein each of said cylindrical units has a perforated contour for forced circulation of said conditioned air radially,
lateral perforated plates disposed inside said adapter along the length of said adapter;
wherein said cylindrical units further comprise at least one filament guide for each of the cylindrical units attached to the top surface of the cover of said adapter for guiding partially-quenched fibres into circular zones.

2. The quenching system as claimed in claim 1, wherein the system includes a spin finish applicator located operatively below said adapter, said spin finish applicator being disposed on an operating front of a cross-flow quench screen, said spin finish applicator being further adapted to be adjusted along the height of said quench stack.

3. The quenching system as claimed in claim 2, wherein the spin finish applicator is adapted to be adjusted along the height of said quench stack, in the range of 0.5 meters to 1.2 meters.

4. The quenching system as claimed in claim 1, wherein the system further includes a yarn guide located operatively below said adapter, said yarn guide being disposed operatively below said spin finish applicator, said yarn guide being adapted to be adjusted along the height of said quench stack.

5. The quenching system as claimed in claim 4, wherein said yarn guide is adapted to be adjusted along the height of said quench stack in the range of 0.5 meters to 1.2 meters.

6. The quenching system as claimed in claim 1, wherein each of said filament guides comprises at least a set of two plates shaped as two diametrically opposite apostrophes with their curved surfaces facing each other; wherein said two plates are attached to a top cover of said adapter such that a gap remains between said two plates; and wherein said gap between said two plates is about 5 mm at the widest portion and 2 mm at the narrowest portion.

7. The quenching system as claimed in claim 1, wherein said second stream is provided via an air duct in flow communication with said cylindrical units of said adapter via at least one platform passage; and wherein said second stream enters said adapter radially via said cylindrical units.

8. The quenching system as claimed in claim 1, wherein said first stream of ambient air is at a temperature of about 25° C. and above; and wherein said second stream of said conditioned air is at a temperature below 25° C.

9. The quenching system as claimed in claim 1, wherein said first means is configured to blow said first stream of ambient air across said quench stack.

10. The quenching system as claimed in claim 1, wherein each of said first means and said second means comprises a blower.

11. The quenching system as claimed in claim 1, wherein said solidification temperature is glass transition temperature ($T_G$).

12. A method for quenching employing said quenching system as claimed in claim 1, said method comprising:
   spinning said molten polymer through said spinneret and into said quench stack disposed operatively below said spinneret:
   subjecting said molten polymer to said first stream of ambient air to provide said partially quenched solidified fibers at said solidification temperature;
   further quenching said partially quenched solidified fibers below said solidification temperature with said second stream of said conditioned air at a below ambient temperature to provide quenched fibers, and herein said second stream of conditioned air is provided separate of said first stream of ambient air through said adapter placed operatively below a region where said molten polymer solidifies partially and operatively above at least one of said spin finish applicator and said yarn guide
   fibers passing through lateral perforated plates disposed inside said adapter along the length of said adapter; and
   partially-quenched fibers guided into circular zones in said cylindrical units by at least one filament guide for each of the cylindrical units attached to the top surface of the cover of said adapter.

13. The method as claimed in claim 12 wherein said first stream of ambient air is at a temperature of 25° C. and above and wherein said second stream of conditioned air is at a temperature below 25° C.

14. The method as claimed in claim 12, wherein said first stream of ambient air is provided substantially perpendicular to a length of said quench stack.

15. The method as claimed in claim 12, wherein each of said first stream of ambient air and said second stream of said conditioned air is provided by a blower.

16. The method as claimed in claim 12, wherein said solidification temperature is glass transition temperature $(T_G)$.

17. The method as claimed in claim 12, wherein said second stream of conditioned air enters said adapter radially.

18. The quenching system as claimed in claim 1, wherein said cylindrical units have a C-shaped cross section to facilitate string up of said filaments.

19. The method as claimed in claim 12, wherein said partially quenched filaments passing through said cylindrical units come in contact with a uniform distribution of said conditioned air force circulated through perforations of said cylindrical units and said lateral perforated plates.

* * * * *